Patented Feb. 4, 1941

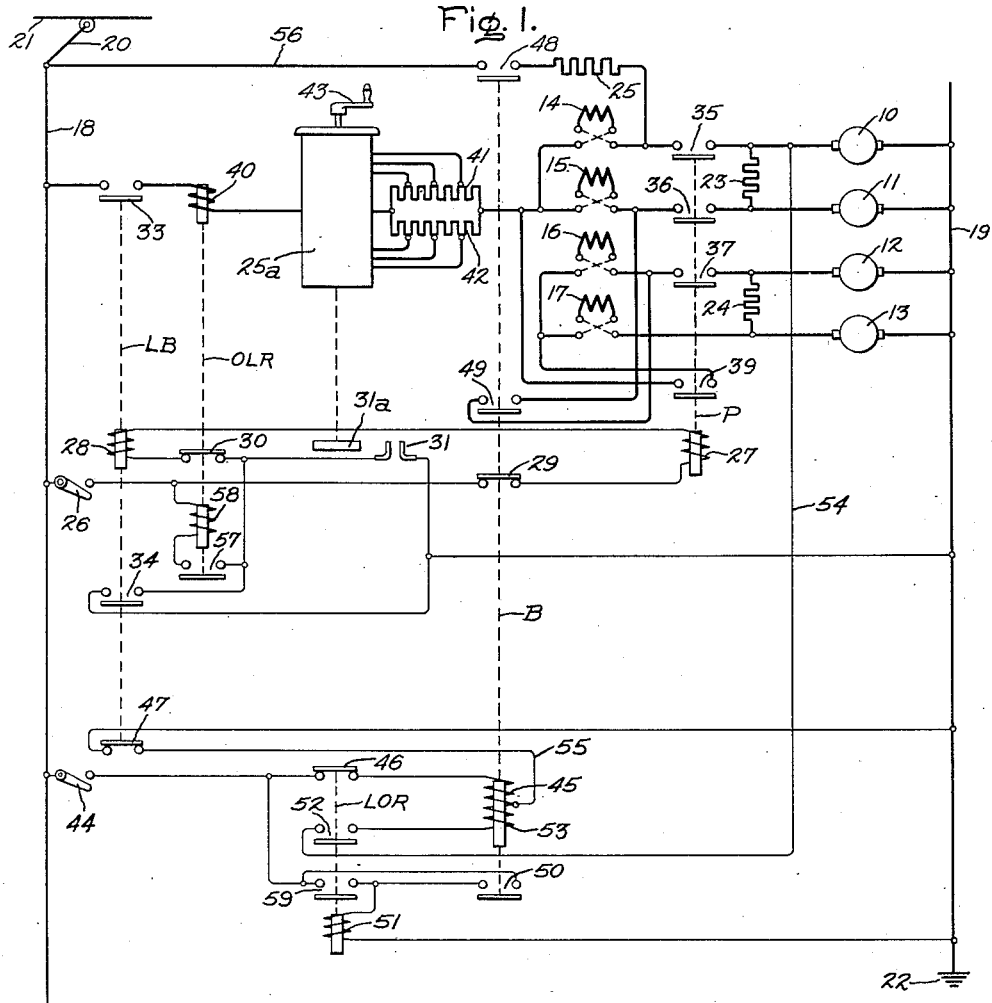

2,230,724

UNITED STATES PATENT OFFICE 2,230,724

CONTROL SYSTEM

Harold G. Moore, Wesleyville, Pa., assignor to General Electric Company, a corporation of New York Application July 25, 1940, Serial No. 347,459

6 Claims. (Cl. 172—179)

My invention relates to control systems for electric vehicles such as electric buses, railway cars and the like, particularly to dynamic braking motor control systems for direct current series motors, and has for its object a simple and reliable control system for a plurality of parallel connected motors.

I have shown my invention in one form as applied to two pairs of parallel connected motors with each pair of which I provide a braking resistor permanently connected across the pair of motors. Because the motors of each pair have the same polarity during acceleration, no current flows through the braking resistor during acceleration. For dynamic braking operation I energize the fields of the motors in series with each other from the supply source with one field of each pair reversed whereby the sum of the voltages of each pair of motors operating as generators is applied to its braking resistor. Also I provide for automatic adjustment of the dynamic braking by connecting one of the motors in the field circuit with its voltage in opposition to the voltage of the supply source.

For a more complete understanding of my invention, reference should be had to the accompanying drawing in which Fig. 1 is a diagrammatic representation of a vehicle drive control system embodying my invention while Fig. 2 is a simplified diagram of connections of the dynamic braking circuits.

Referring to the drawing, I have shown my invention in one form as applied to two pairs of series direct current motors having armatures 10, 11 and 12, 13, and being provided with series fields 14, 15 and 16, 17. For motoring operation, these motors are connected in parallel with each other to direct current supply mains 18 and 19, the supply main 18 being connected through a suitable trolley connection device 20 to a trolley conductor 21, while the supply main 19 is connected to a ground connection 22. Also during motoring operation, each field winding is connected in circuit with its associated armature.

Two dynamic braking resistors 23 and 24 are connected permanently and respectively across equal voltage points on the high voltage ungrounded sides of the pairs of armatures 10, 11 and 12, 13. During motoring operation, since the voltages of the motors are equal, no potential difference appears across the braking resistors and therefore no current flows through them. For dynamic braking operation, the armatures of the motors (except one) are disconnected from their field windings and from the supply source.

Also the field windings are connected in series with each other through the supply source and in series with a resistor 25, one field of each pair being reversed so that the generator voltages of each pair of motors are in the same direction. Consequently currents are generated by each pair of motors through the respective braking resistor for dynamic braking.

In the operation of the system, the motors are started by moving the controller 25a from its off position to its first position closing a switch 26 to energize the P switch coil 27 and the LB switch coil 28 in series with each other. This control circuit leads from the supply main 18 through the switch 26, the B switch 29, the P coil 27, the LB coil 28, the OLR switch 30, which is normally closed, a switch 31 which is closed to the supply main 19. The switch 31 is in the manually operated controller 25a and is closed by a cam 31a when the controller is in any operative position, although when the controller is moved to an off position the switch 31 is open as shown. If the switch 26 is already closed, the coils 27 and 28 are energized when the controller 25a is turned from its off position to its first position to close the switch 31.

When energized, the coil 28 closes the LB switch 33 in the circuit of the motors and an interlock switch 34 around the switch 31, while the P coil 27 closes the switches 35, 36 and 37 in the individual motor circuits and a switch 39 in the circuit of one pair 12, 13 of the motors. This connects the motors in parallel with each other, the circuit leading from the main 18 through the LB switch 33, the OLR coil 40, through the controller 25a, the two starting resistors 41 and 42 in parallel with each other, and thence through the switch 39 to motor fields 16 and 17 and motor armatures 12 and 13 to the main 19. A parallel circuit exists from starting resistor 41 and 42 and thence through the motor fields 14 and 15 and motor armatures 10 and 11 to the main 19. The acceleration of the motor is effected by turning the controller by means of a handle 43 so as to successively short out or exclude sections of the resistors 41 and 42 by suitable switches (not shown) and thereby accelerate the motors.

For dynamic braking, the switch 26 is opened to deenergize the coils 27 and 28 and thereby open the motoring switches. Then a switch 44 is closed to energize the upper section 45 of the B switch coil, this circuit from the main 18 through the switch 44, the LOR switch 46, the coil section 45, the LB switch 47 and thence to the main 19. Thereupon the coil 45 closes the B switches 48 and 49 to establish the dynamic braking connections for the motors.

At the same time the coil 45 closes its interlock switch 50 which, in turn, energizes the LOR coil 51. The LOR coil 51 thereupon opens its switch 46 to deenergize the coil section 45 and closes its switch 52 thereby connecting the B coil section 53 across the motor 10 whereby the switches 48 and 49 are maintained closed by the voltage across the motor 10 acting as a generator. This circuit for the coil section 53 leads from the high potential side of the motor armature 10 through the conductor 54, the switch 52, the coil 53, the conductor 55, the switch 47 and thence to the supply main 19 on the other side of the motor 10. Therefore the coil 53 is energized sufficiently to maintain the braking switches 48 and 49 closed and maintain dynamic braking as long as the voltage of the motor 10 and hence the speed of the vehicle, are above predetermined limits. The vehicle speed limit may, for example, be 5 or 10 miles per hour.

The dynamic braking connections are now as shown in Fig. 2. They may be traced in Fig. 1 from the main 18 through the conductor 56, the switch 48, the field resistor 25, the field winding 14, which is thus reversed, the field winding 15, the switch 49, the field winding 16 which is reversed, the field winding 17 and the motor armature 13 to the main 19 and thence to ground. Furthermore, the motor armatures 10 and 11 are connected in series relation with each other across their dynamic braking resistor 23 while motor armatures 12 and 13 are connected in series relation with each other across their dynamic braking resistor 24.

The voltage of the armature 13 opposes the voltage of the supply mains 18 and 19. Consequently as the speed and the voltage of the armature 13 decreases, the current through the field windings increases to maintain thereby a substantially constant dynamic braking effort over a wide range of vehicle and motor speeds. The conductor 56 may be connected to any suitable low-voltage supply source, such as a battery or a generator with corresponding reduction in ohmic value of resistor 25. This reduces the energy loss in this resistor.

In the event of an overload current in the motor circuit greater than a predetermined maximum value, the OLR coil 40 picks up its armature, opening the switch 30 to deenergize the motors and closing the switch 57. The switch 57 establishes a circuit through the OLR coil 58 which holds the switch 30 open and the switch 57 closed until such time as switch 26 is opened for restarting of the motors.

An LOR switch 59 which is normally open is also provided. This switch is closed when the coil 51 is energized, and thereby closes a holding circuit around the switch 50 for the coil 51. Therefore the coil 51 is maintained energized when the switch 50 subsequently opens and until the control switch 44 is opened.

The control switch 44 is manually operated and may be connected to a pedal. Also the switch 26 may be manually operated. Preferably the switch 26 is actuated with the controller 25a in a well-known manner such that the switch 26 is closed whenever the handle 43 is turned from the off-position toward the full running position. Any reverse movement of the handle, however, opens the switch 26. This operates to deenergize the coils 27 and 28 and thus open the motor circuit so that there will be no arcing in the controller 25a when it is turned in the reverse direction to reinsert the resistors 41 and 42 in the circuit.

While I have shown a particular embodiment of my invention, it will be understood, of course, that I do not wish to be limited thereto, since many modifications may be made and I, therefore, contemplate by the appended claims to cover any such modifications as fall within the true spirit and scope of my invention.

What I claim as new and desire to secure by Letters Patent of the United States is:

1. An electric motor control system comprising a pair of driving motors each provided with an armature and a field winding, connections for connecting said motors in circuits in parallel with each other to a source of electric supply for motoring operation, a dynamic braking resistor connected to equal voltage points of said motors, and means for disconnecting said armatures from the source of supply and for reversing the polarity of one of said armatures for dynamic braking operation.

2. An electric motor control system comprising a pair of driving motors each provided with an armature and a series field winding, connections for connecting said motors in circuits in parallel wtih each other to a source of electric supply with the field winding of each motor in series with its armature for motoring operation, a dynamic braking resistor connected to said motors across equal voltage points of said circuits, and switching means for disconnecting said armatures from the source of supply and for reversing the polarity of one of said armatures for dynamic braking operation.

3. An electric motor control system comprising a pair of driving motors each provided with an armature and a field winding, connections for connecting said motors in circuits in parallel with each other to electric supply conductors for motoring operation, a dynamic braking resistor permanently connected to said motors across equal voltage points of said circuits, means for disconnecting like terminals of said armatures from one of said supply conductors and for reversing one of said field windings for reversed polarity of one of said armatures for dynamic braking.

4. An electric motor control system comprising a pair of driving motors each provided with an armature and a field winding, connections for connecting said motors in circuits in parallel with each other to electric supply conductors for motoring operation, a dynamic braking resistor permanently connected to said motors across equal voltage points of said circuits, means for disconnecting like terminals of said armatures from one of said supply conductors and for reversing one of said field windings for reversed polarity of one of said armatures and with the other of said armatures in circuit with at least one of said field windings so that said armatures supply dynamic braking current through said braking resistor and said dynamic braking current is regulated in accordance with the voltage of said other armature.

5. An electric vehicle control system comprising a pair of driving motors each provided with an armature and a series field winding, connections for connecting said motors in circuits in parallel with each other to a source of electric supply with the field winding of each motor in series with its armature for motoring operation, a dynamic braking resistor permanently connected to said motors across equal voltage points of said parallel circuits, switching means for disconnecting one terminal of one of said armatures from the source of supply and from its field winding, and connections for connecting said field windings in series with each other with the connections of one of said field windings reversed with respect to said other field winding to an electric source of energy supply in series with the other of said armatures whereby said motors supply dynamic braking current through said braking resistor and the dynamic braking current is regulated in accordance with the voltage of said other armature.

6. An electric vehicle control system comprising at least two pairs of driving motors each motor being provided with an armature and a series field winding, connections for connecting said motors in circuits in parallel with each other to a source of electric supply with the field winding of each motor in series with that motor, a dynamic braking resistor permanently connected to each of said pairs of motors across equal voltage points of said circuits, means for disconnecting said armatures from the source of supply and for reversing one of the field windings of each pair for reversed polarity of one armature of each pair and with the other armature of one pair in circuit with said field windings so that said armatures supply dynamic braking current through said braking resistors and said dynamic braking current is regulated in accordance with the voltage of said other armature.

HAROLD G. MOORE.